April 28, 1942.   Y. BOLES   2,281,226
APPARATUS AND SYSTEM FOR MEASURING TORQUE
Filed Sept. 11, 1939
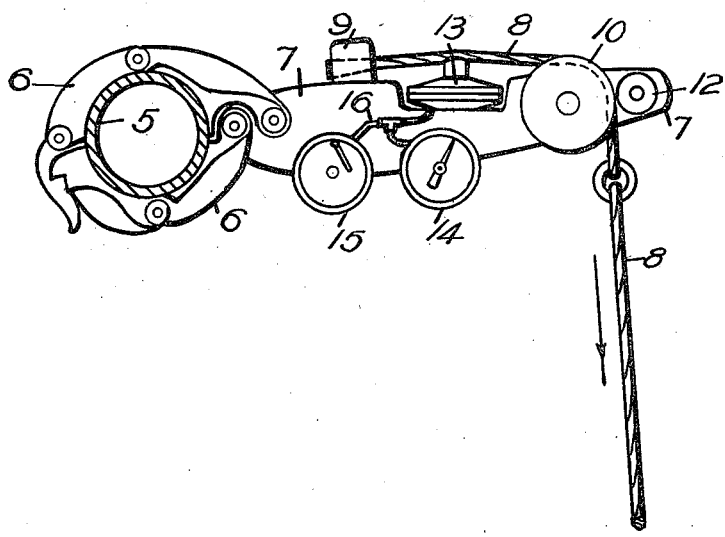
INVENTOR.
YOUNSE BOLES
BY
Rollandet, McGrew & Campbell
ATTORNEYS Patented Apr. 28, 1942

2,281,226

UNITED STATES PATENT OFFICE 2,281,226

APPARATUS AND SYSTEM FOR MEASURING TORQUE

Younse Boles, Pinedale, Wyo.

Application September 11, 1939, Serial No. 294,331

3 Claims. (Cl. 265—1)

This invention relates to apparatus and a system for measuring torque.

As is well known to those familiar with drilling oil wells or the like, drill pipe, casing, etc. are screwed together under considerable torsion as they are run into the well. Powerful equipment is commonly used for making up or breaking out such threaded joints. It sometimes occurs that such a high degree of torsion is applied to pipe or casing that said pipe or casing or the couplings connecting the joints thereof may be seriously damaged. This damage may not be discovered until after the pipe or casing has been placed in the well. If trouble develops from this source down in the well, it may be a very serious and expensive matter to correct.

Therefore, it is a principal object of the present invention to provide apparatus for measuring the torsion applied to a drill pipe, casing or the like, in making up or breaking out the joints thereof.

Another object is to provide such an apparatus that will make a record of the torsion so applied.

Other objects and advantages reside in details of design and construction which will be more fully disclosed in the following description and in the drawing wherein like parts have been similarly designated and in which:

The drawing is a plan view of apparatus made according to this invention, illustrating the pipe or casing with which it is in use, in cross section.

In order to disclose an operable reduction to practice of the present inventive concept, reference will be had to the accompanying drawing which illustrates a typical example of apparatus made according to this invention and the improved system used in performing the invention.

Since variations from the illustrated example may occur to those skilled in the art, it is to be understood that the apparatus and system herein illustrated and described is not intended to express or imply any limit to the scope of this invention, which is measured by the appended claims.

In the drawing, reference character 5 denotes, in cross section, a typical pipe or casing that is being screwed together for running into a well. For this purpose, the pipe is suspended in the usual manner as is understood by anyone experienced in the art. Tongs 6, inclusive of lever handle 7, grip the pipe or casing 5 for applying torsion thereto, as is the usual practice.

A cable 8, known in well-drillers' parlance as a tug, jerk line, or backup line, is securely anchored to the lever arm 7 at 9. The cable 8 is reeved over a grooved pulley or sheave 10 carried on the lever arm 7 and may be held in its proper position in this sheave by means of an idler or guide roller 12.

The end of the cable 8 that extends away from the lever arm 7 is ordinarily attached to a winch-like power unit usually referred to as the cathead. This power unit is adapted to pull the cable to apply torsion to the pipe or casing 5 through the intermediary of tongs 6—7.

Between the groove pulley or sheave 10 and the place of cable anchorage 9 upon the lever arm 7, the cable 8 passes over a diaphragmed pressure unit 13 which is so positioned between the anchor 9 and the sheave 10 that a portion of the cable 8 therebetween is normally held out of a straight-line position.

The pressure unit 13 is filled with a substantially non-compressible liquid and the interior of said pressure unit is in conductive communication with an indicating gage 14 and a recording gage 15 through the intermediary of a system of small pipes or tubes 16.

The sheave 10 is preferably journalled on anti-friction-type bearings so that it is free to rotate upon the arm 7. Obviously, as tension is applied upon the cable 8, compressive force will be applied to the body of liquid within the pressure unit 13 and this pressure will be communicated through the pipes or tubes 16 to the gages 14 and 15. The gage 14 may be any standard type pressure indicating gage and as the pointer or needle thereof rotates, the operator may read the force being applied to cable 8, which is being converted into torsion applied to the pipe or casing 5 through the intermediary of the lever handle 7 of the tongs 6.

Gage 15 may be any well-known type of recording gage so that a permanent record is made of the variations in the torsion being applied.

Thus, the stated objects of the present invention are well accomplished in that the apparatus and system herein illustrated and described, provide visible means for measuring or indicating torque and also for recording torque variations, in combination with means for applying torque to a well pipe or any other similar application of torque or moments of force.

While this specification discloses preferred means for reducing the present invention to practice and a preferred embodiment of the invention, changes may occur to those skilled in the art and may be made within the scope of the appended claims, without departing from this inventive concept.

What I claim and desire to secure by Letters Patent is:

1. Apparatus of the character disclosed comprising work-engaging means, a lever arm attached thereto, a pulley journalled for rotation on the arm, a cable reeved over the pulley and anchored to the arm, pressure-responsive means inclusive of a liquid-filled bellows positioned between the pulley and the point of anchorage of the cable, in a position to contact and to deflect said cable for measuring torque applied to the arm by the cable, and pressure-indicating means connected with said bellows.

2. Apparatus of the character disclosed comprising work-engaging means, a lever arm attached thereto, a pulley journalled for rotation on the arm, a cable reeved over the pulley and anchored to the arm, and pressure-responsive means comprising a pressure chamber having a body of confined fluid therein and positioned between the pulley and the point of anchorage of the cable, in deflecting contact with said cable, and a gage in operative connection with said pressure chamber, for measuring torque applied to the arm by the cable.

3. A system for measuring torque comprising tongs inclusive of a lever arm, a pulley journalled for rotation on the arm, a cable reeved over the pulley and anchored to the arm, a compressible element on the arm in a position to contact and to deflect said cable between the pulley and the place of anchorage of the cable to the arm and normally to hold it out of a straight line position, and an indicative element operatively connected with said compressible element.

YOUNSE BOLES.